Figure 1:
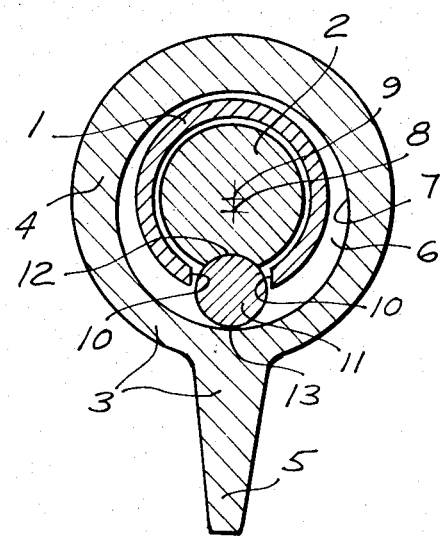

United States Patent [19]
Carlsson

[11] 3,773,371
[45] Nov. 20, 1973

[54] DEVICE FOR THE RECIPROCAL SECURING OF TWO ELONGATED MEMBERS TELESCOPICALLY ARRANGED IN RELATION TO EACH OTHER

[75] Inventor: Carl Ingvar Carlsson, Tidaholm, Sweden

[73] Assignee: Aktiebolaget Bofors, Bofors, Sweden

[22] Filed: Feb. 24, 1971

[21] Appl. No.: 118,451

[30] Foreign Application Priority Data
Mar. 9, 1970  Sweden .............................. 3093/70

[52] U.S. Cl. ......... 292/262, 287/52.09, 287/DIG. 8, 287/58 CT, 292/278
[51] Int. Cl. .......................................... E05c 17/30
[58] Field of Search ..................... 339/274; 292/262, 292/305, 275; 16/140, 149; 287/52.09, DIG. 8, 58 CT

[56] References Cited
UNITED STATES PATENTS
2,410,961  11/1946  Carson ............................... 339/274
2,251,253  7/1941  Miller .......................... 287/52.09 X
220,215  10/1879  Blackhall ......................... 287/52.09
880,255  2/1908  Vandegrift et al. .......... 287/52.09 X
1,527,981  3/1925  Kimball .............................. 292/275

FOREIGN PATENTS OR APPLICATIONS
635,526  1/1962  Canada ........................... 287/58 CT
230,314  6/1944  Switzerland .................... 287/58 CT Primary Examiner—Richard E. Moore
Attorney—Hane, Baxley & Spiecens

[57] ABSTRACT

A device for releasably locking a rod of circular cross-section within a tube of circular cross-section comprises a locking ring fitted with plate upon the tube. The inner wall of this ring is eccentric with respect to the center axis of the ring. The tube has in its wall a cutout into which is fitted a cylindrical locking pin, the diameter of which is such that in one angular position of the ring the pin permits the rod to occupy a position in which the pin is free to rotate about its axis while in another angular postion of the ring the pin presses the rod against the tube due to the eccentricity of the inner wall of the locking ring. As a result, the rod is locked within the tube. Release is effected by returning the locking ring into its initial angular position.

4 Claims, 3 Drawing Figures

3,773,371

DEVICE FOR THE RECIPROCAL SECURING OF TWO ELONGATED MEMBERS TELESCOPICALLY ARRANGED IN RELATION TO EACH OTHER

The present invention relates to a device for the reciprocal securing of two elongated members telescopically arranged in relation to each other. There are a plurality of uses for such devices, which are of great value, e.g., for continuously variable securing of windows that can be opened. For such purposes it is previously known to make the two members which are telescopically arranged in relation to each other in such a way that reciprocal securing is achieved by turning one of these members. However, such turning of one of the members involves substantial drawbacks from the point of view of design and strength.

Through the present invention, it has now become possible to eliminate these drawbacks. The invention is characterized in that there are two elongated members telescopically arranged in relation to each other, the outer and the inner member then being encircled by a part that can be turned around the portion of the outer member that always overlaps the inner member, and that the encircling part has a cavity made in such a way in relation to the outer member that the distance between its limiting surface and the centre line of the outer member varies along the periphery of the limiting surface. This variation should then be such that for a certain predetermined turning angle between the encircling part and the outer member, the limiting surface, owing to said varying distance, actuates the inner member via a force-transmitting implement arranged in a slot in the outer member. At this actuation, the force-transmitting implement will then press the inner member against the inner surface of the outer member, whereby the two members will be reciprocally secured through friction. On the other hand, at another turning angle between the encircling part and the outer member, the two members will be movable axially in relation to each other. The cavity can appropriately be made cylindrical, and the center line of the cavity is then to deviate from the center line of the outer member. Further, the force-transmitting implement can consist of a cylindrical roller, arranged in such a way in the slot in the outer member that the envelope surface of this cylindrical roller will be in contact with the encircling part as well as with the inner member. The inner member can appropriately have a longitudinal groove, made in such a way that it corresponds to the curvature of the envelope surface of the cylindrical roller. The securing device according to the invention can be used to advantage for securing windows that can be opened.

The invention will now be described in more detail through an example of an embodiment shown in the accompanying drawing, which example, however, is only a representative embodiment, and does not limit the concept of the invention within the scope of the present claims.

Figure 2:
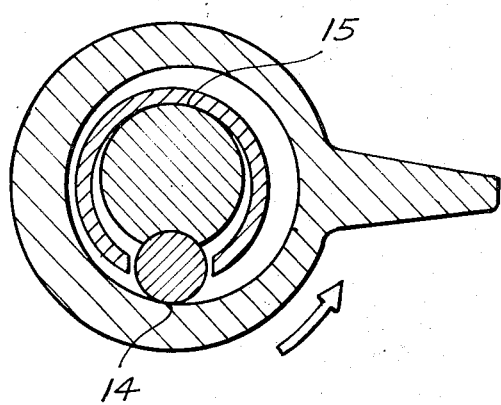
Figure 3:
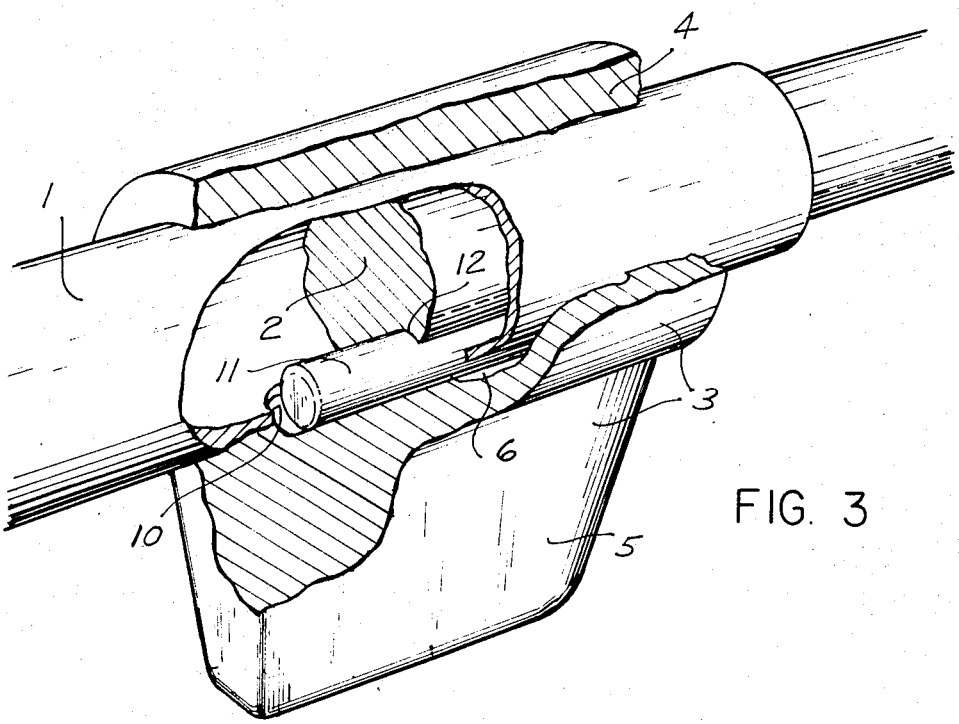

In the drawing, FIG. 1 shows a cross-section (viewed from line A—A of FIG. 3) through the securing device according to the invention in such a position that the two telescopically arranged members are not in contact with each other, while FIG. 2 shows the same cross-section but with such a turning angle that the two members have been secured. FIG. 3, finally, shows in perspective and partly cut away, the same device according to the invention.

The two members telescopically arranged in relation to each other consist of an outer tube 1, and inside this tube, the rod 2. Around the end of the tube 1 where the inserted rod 2 is always overlapped by the tube 1, an encircling part 3 is rotatably arranged. This part 3 substantially consists of a sleeve 4 encircling the tube 1, on which a wing 5 is arranged, which wing is intended to facilitate the turning of the part 3 as well as to indicate the position to which this part has been turned. In the sleeve 4 of the part 3 a cavity 6 between axial points $b$ and $c$ is defined by circumferential ridges 17 and 18 and has a cylindrical camming surface 7 in the embodiment here shown. The circumferential ridges 17 and 18 between axial points $a$ and $b$, and $c$ and $d$, respectively, act as bearings and have roughly the same inner diameter as the outer diameter of outer tube 1. The difference in diameters is sufficient to permit sleeve 4 to be rotated about tube 1. However, the inner diameter of the inner wall 7 of sleeve 4 between axial points $b$ and $c$, i.e., cavity 6 has a much larger diameter. This inner wall 7 in the region of cavity 6 constitutes a cylindrical camming surface which is so arranged in sleeve 4 that its center axis 8 between axial points $b$ and $c$ does not coincide with the center axis between the axial points $a$ and $b$, and $c$ and $d$ of ridges 17 and 18. Thus the center axis of the ridges 17 and 18 always coincides with the center axis 9 of outer tube 1, but the center axis of the inner wall 7 in the region of cavity 6 never coincides with center axis 9.

In the tube 1 there is also a slot 10 which is within the cavity 6. In this slot 10 a roller 11 is arranged, and this is partly inserted in the rod 2 in a groove 12 extending along this rod 2.

At a position of the member 3 which is shown in FIG. 1 the distance between the camming surface 7 of cavity 6 at the point 13 where it is in contact with the roller 11 and center line 9 of the tube is such that the rod 2 is not pressed against the encircling tube 1, but is freely movable in relation to this. In the position of the part 3 which is shown in FIG. 2, however, the distance between the point 14 on the camming surface 7 of cavity 6 where the roller 11 is in contact and the center line 9 of the tube 1 is such that via said roller 11 the rod 2 will be pressed against the inner surface 15 of the tube 1. In this way, through friction, the two members 1 and 2, telescopically arranged in relation to each other, will be secured reciprocally, and accordingly the rod 2 will no longer be movable in relation to the tube 1.

I claim:

1. A releasable locking device for selectively locking two telescopically disposed elongate members to each other, said locking device comprising in combination:
   an outer tubular member having inner and outer wall surfaces of circular outline;
   an inner elongate substantially rigid member of circular cross-section disposed within the outer member, the inner diameter of the outer member being larger than the outer diameter of the inner member, said inner member being displaceable parallel to the center axis of the outer member; and
   a releasable locking means including a sleeve rotatably encompassing said outer member, two axially spaced circumferential bearing ridges extending inward from the inner surface of said sleeve to define a cylindrical cavity, the peripheries of said ridges being circular and having an inner diameter substantially equal to the outer diameter of said outer member, whereby said ridges and outer member have the same center axis, the cylindrical cavity having a diameter grater than the diameter of said outer member and a center axis eccentric with reference to the center axis of said outer member so that the inner wall of the cylindrical cavity constitutes a camming surface, said outer member having a slot in its peripheral wall in the region of the cylindrical cavity, and a locking member substantially radially slidable in said slot, said locking member abutting the camming surface and being engageable with the inner member for control of the radial position of the locking member by the angular position of the camming surface, the size of said locking member being such that in one predetermined rotational position of the camming surface relative to the outer surface of the outer member, the locking member releases the inner member from the outer member and in another predetermined rotational position of the camming surface, the locking member is displaced into a position in which it presses the inner member against the outer member, thereby locking the inner member to the outer member.

2. The device according to claim 1 wherein said locking member is a cylindrical roller.

3. The device according to claim 2 wherein said inner member has a longitudinal groove having a contour corresponding to a portion of the cylindrical surface of said roller on which it lies.

4. The device according to claim 1 wherein said sleeve is provided with a wing to facilitate the turning thereof and to indicate its angular position.

* * * * *